United States Patent [19]

Liao

[11] Patent Number: 5,285,698
[45] Date of Patent: Feb. 15, 1994

[54] STOPPER DEVICE FOR AN AUXILIARY HANDLEBAR

[75] Inventor: Jim Liao, Taipei Hsien, Taiwan
[73] Assignee: Hsin Lung Accessories Co. Ltd., Taiwan
[21] Appl. No.: 9,560
[22] Filed: Jan. 26, 1993
[51] Int. Cl.$^5$ .................. B62K 21/12; F16C 11/00
[52] U.S. Cl. .................. 74/551.8; 74/551.3; 403/87; 403/103
[58] Field of Search .......... 74/551.1, 551.2, 551.3, 74/551.8, 551.9; 403/86, 87, 103; 280/279

[56] References Cited
U.S. PATENT DOCUMENTS

| | | | |
|---|---|---|---|
| 3,918,323 | 11/1975 | Prager | 74/551.8 |
| 4,700,964 | 10/1987 | Hess | 74/551.8 |
| 5,033,790 | 7/1991 | Schilplin et al. | 403/87 |
| 5,197,349 | 3/1993 | Herman | 74/551.1 |
| 5,197,350 | 3/1993 | Borromeo | 74/551.8 |
| 5,201,242 | 4/1993 | Chi | 74/551.1 |
| 5,201,244 | 4/1993 | Stewart et al. | 74/551.3 |

FOREIGN PATENT DOCUMENTS

| | | | |
|---|---|---|---|
| 3938276 | 4/1991 | Fed. Rep. of Germany | 74/551.8 |
| 4-143185 | 5/1992 | Japan | 74/551.8 |

*Primary Examiner*—Vinh T. Luong
*Attorney, Agent, or Firm*—Andrus, Sceales, Starke & Sawall

[57] ABSTRACT

A stopper device comprises a rod member having a diameter which is the same as the outer diameter of the free end of the auxiliary handlebar. The rod member further includes a fastening shaft attached to the lower end portion of the rod member. The fastening shaft can be inserted into the free end of the auxiliary handlebar securing the rod member thereof. A supporting rod member is angularly formed on the upper end of the rod member and provides a solid support to the thumb of the rider.

1 Claim, 3 Drawing Sheets

STOPPER DEVICE FOR AN AUXILIARY HANDLEBAR

FIELD OF THE INVENTION

This invention relates to a stopper device, and more particularly, to a stopper device for an auxiliary handlebar of a bicycle.

BACKGROUND OF THE INVENTION

The handlebar of a bicycle, especially those of racing bicycles, is provided with an auxiliary handlebar in the end portion of the handlebar. Most auxiliary handlebars are formed directly at the end portion of the handlebar. Another type of the auxiliary handlebar is one which is an individual device and attached to the free end of the handlebar.

The function of the auxiliary handlebar 40 is to provide a strong support of the rider, especially in racing. As shown in FIG. 1, the auxiliary handlebar 40 is a simple tubular rod member, straight and without any stopper. When the rider grasps on the auxiliary handlebar 40, the friction between the auxiliary handlebar 40 and the palms becomes relatively low as the rider increases the speed of the bicycle, since in this case, the weight of the upper body concentrates largely on the hands. This will bring a negative effect on the rider since his palms will slide over the auxiliary handlebar 40. Should the bicycle become unstable due to the rider's palm sliding over the auxiliary handlebar 40, the rider might be injured by an accident.

It is the primary object of the instant invention to provide a stopper device to the auxiliary handlebar of a bicycle which device is attached to the free end of the auxiliary handlebar, allowing the auxiliary handlebar to furnish a strong support to the palms to avoid any sliding motion thereof.

The stopper device according to the present invention comprises a rod member having a diameter which is the same as the outer diameter of the free end of the auxiliary handlebar. Said rod member further includes a fastening shaft attached to the lower end portion of said rod member, said fastening shaft capable of being inserted into said free end of said auxiliary handlebar securing said rod member thereof. A supporting rod member which is angularly mounted on said upper end of said rod member provides a solid support to the thumb of the rider.

BRIEF DESCRIPTION OF THE DRAWINGS

Other features and advantages of the present invention will become apparent when the following description is read in conjunction with the accompanying drawings, in which:

Referring to FIGS. 2 and 3, the stopper device 1 according to the present invention comprises a rod member 10 having a diameter which is the same as the outer diameter of the free end 41 of the auxiliary handlebar 40. Said rod member 10 further includes a fastening shaft 20 attached to the lower end portion 11 of said rod member 10. Said fastening shaft 20 can be inserted into said free end 41 of said auxiliary handlebar 40 securing said rod member 10 thereof. Said rod member 10 further includes a circular recess 12 and a hole 13 is provided in said circular recess 12, which hole 13 extends into the middle portion 21 of said fastening shaft 20. A bolt member 14 can be inserted into the middle portion 21 of said fastening shaft 20. Said fastening shaft 20 further includes a inclined portion 23 on the lower end portion 22 thereof. Said fastening shaft 20 further includes a locking block 24 having an inclined portion 242 which is attached to the inclined portion 23 of said fastening shaft 20. Said locking block 24 further includes a threaded recess 25 in the middle portion in which said bolt member 14 can be secured. A supporting rod member 30 which is angularly formed on the upper end of said rod member 10 provides a solid support to the thumb of the rider.

Figure 1:
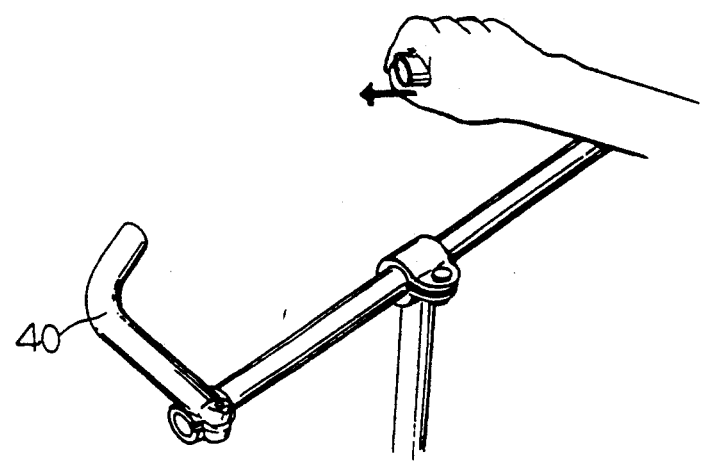
FIG. 1 is a typical auxiliary handlebar of the prior art.
Figure 2:
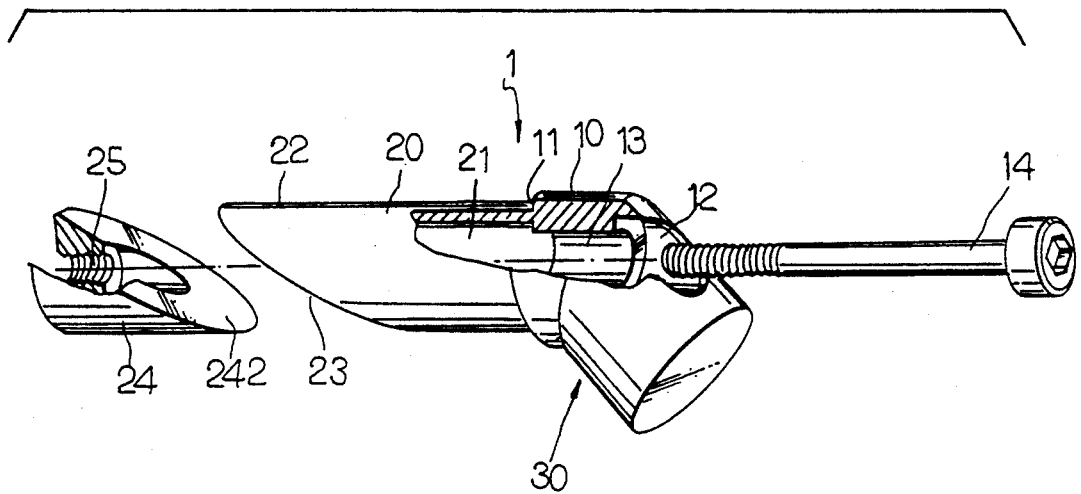
FIG. 2 is an exploded perspective view of the stopper device according to the instant invention.
Figure 3:
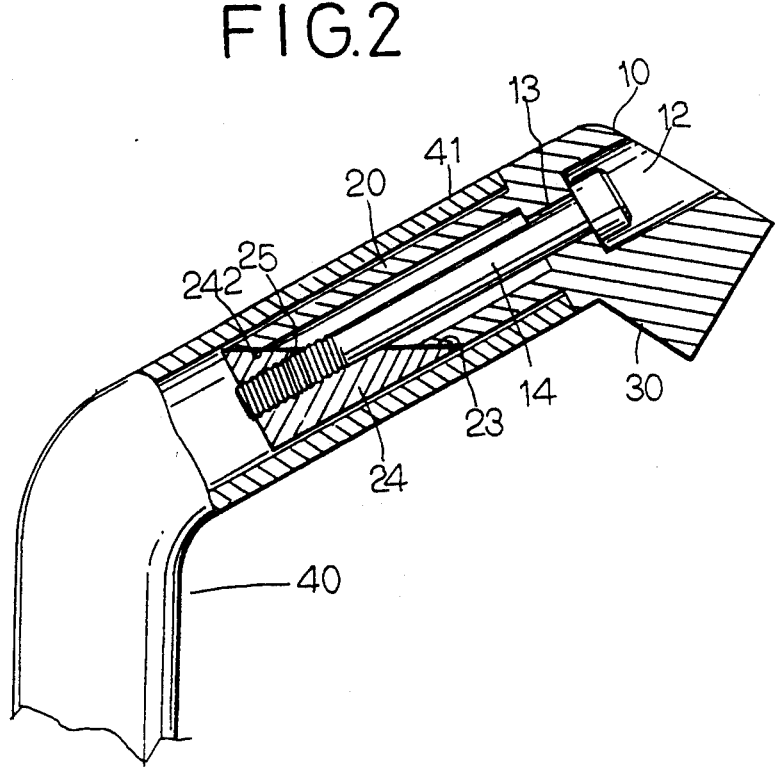
FIG. 3 is a cross-sectional view of the stopper device according to the instant invention as secured to the free end of the auxiliary handlebar.

In assembling the stopper device 1 according to the instant invention, said bolt member 14 is first inserted into said hole 13 of said circular recess 12 and extended into the lower portion of said fastening shaft 20. Said locking block 24 is then attached to said bolt member 13 with its threaded recess 25. The assembled stopper device 1 is then inserted into the free end 41 of said auxiliary handlebar 40. By rotating said bolt member 13, said locking block 24 will move closer to said fastening shaft 20 splitting each other along their inclined portion 23, 242 toward the inner wall of said auxiliary handlebar 40, consequently securing said rod member 10 thereof.

Figure 4:
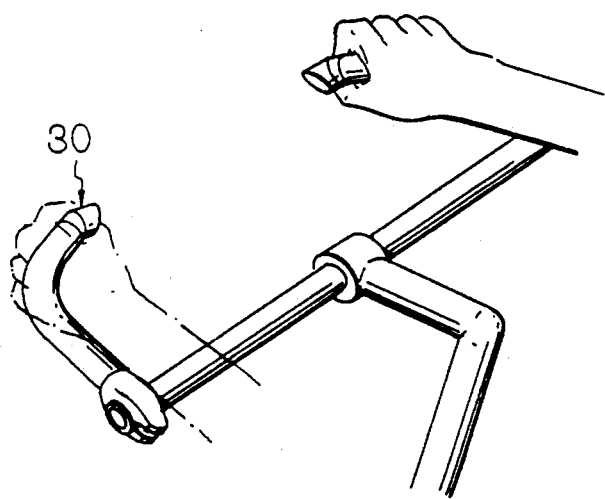
FIG. 4 is a perspective view of an auxiliary handlebar having a stopper device secured in the free end thereof.

Referring to FIG. 4, said supporting member 30 provides a solid support to the thumb of the rider. Hence, the rider can grasp on said auxiliary handlebar firmly without any possibility of his palm slipping out thereof.

Although the present invention has been described in connection with the preferred embodiment thereof, many other variations and modifications will now become apparent to those skilled in the art without departing from the scope of the invention. It is preferred, therefore, that the present invention not be limited by the specific disclosure herein, but only by the appended claims.

I claim:

1. A stopper device for a hollow auxiliary handlebar for a bicycle comprising:

a rod member having an outer diameter corresponding to an outer diameter of a free end of the auxiliary handlebar, said rod member including a fastening shaft attached to a first end portion of said rod member, said fastening shaft being insertable in the free end of the auxiliary handlebar and having an inclined end surface, a circular recess in a second end portion of said rod member having a hole passing centrally through said fastening shaft, and a supporting rod member angularly formed on said second end portion of said rod member for providing a solid support to a thumb of a rider of the bicycle;

a locking block having a threaded recess in its central portion, said locking block having an inclined surface abuttable with the inclined end surface of said fastening shaft; and a bolt member inserted in said hole of said circular recess and extending through said fastening shaft and screwed into threaded recess of said locking block for bringing the inclined end surface of said fastening member and the inclined surface of said locking block into abutment.

* * * * *